US010023777B2

(12) United States Patent
Cheng et al.

(10) Patent No.: US 10,023,777 B2
(45) Date of Patent: Jul. 17, 2018

(54) ADHESIVE COMPOSITIONS AND METHODS OF ADHERING ARTICLES TOGETHER

(71) Applicant: The United States of America, as represented by the Secretary of Agriculture, Washington, DC (US)

(72) Inventors: Huai N Cheng, Metaire, LA (US); Catrina V. Ford, Harvey, LA (US); Michael K Dowd, Metairie, LA (US); Zhongqi He, New Orleans, LA (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 15/380,283

(22) Filed: Dec. 15, 2016

(65) Prior Publication Data
US 2018/0171194 A1 Jun. 21, 2018

(51) Int. Cl.
| | | |
|---|---|---|
| *C09J 189/00* | (2006.01) | |
| *C09J 11/06* | (2006.01) | |
| *C09J 105/14* | (2006.01) | |
| *C09J 11/04* | (2006.01) | |
| *C09J 103/02* | (2006.01) | |
| *C09J 101/02* | (2006.01) | |
| *C09J 5/06* | (2006.01) | |
| *B32B 21/02* | (2006.01) | |
| *B32B 21/13* | (2006.01) | |
| *B32B 21/14* | (2006.01) | |
| *B32B 7/12* | (2006.01) | |
| *B32B 5/02* | (2006.01) | |
| *B32B 5/16* | (2006.01) | |
| *B32B 37/12* | (2006.01) | |
| *B32B 37/10* | (2006.01) | |
| *B32B 37/06* | (2006.01) | |

(52) U.S. Cl.
CPC ............... *C09J 189/00* (2013.01); *B32B 5/02* (2013.01); *B32B 5/16* (2013.01); *B32B 7/12* (2013.01); *B32B 21/02* (2013.01); *B32B 21/13* (2013.01); *B32B 21/14* (2013.01); *B32B 37/06* (2013.01); *B32B 37/10* (2013.01); *B32B 37/12* (2013.01); *C09J 5/06* (2013.01); *C09J 11/04* (2013.01); *C09J 11/06* (2013.01); *C09J 101/02* (2013.01); *C09J 103/02* (2013.01); *C09J 105/14* (2013.01); *B32B 2250/02* (2013.01); *B32B 2317/16* (2013.01); *C09J 2400/303* (2013.01); *C09J 2401/00* (2013.01); *C09J 2403/00* (2013.01); *C09J 2405/00* (2013.01); *C09J 2489/00* (2013.01)

(58) Field of Classification Search
CPC . C09J 11/04; C09J 11/06; C09J 105/14; C09J 103/02; C09J 101/02; C09J 5/06; C09J 2401/00; C09J 2403/00; C09J 2405/00; C09J 2489/00; C09J 2400/303
See application file for complete search history.

(56) References Cited

U.S. PATENT DOCUMENTS

| | | | | | |
|---|---|---|---|---|---|
| 5,523,293 | A | * | 6/1996 | Jane ..................... | A23J 3/04 106/126.1 |
| 8,293,821 | B1 | * | 10/2012 | Tillman ................. | C09J 103/02 264/533 |
| 2015/0267095 | A1 | * | 9/2015 | Parker ................... | C09J 189/00 428/355 CP |

OTHER PUBLICATIONS

Norstrom, E., et al.; European Polymer Journal, 2015, p. 483-493.*
Cheng, H.N., et al.; Industrial Crops and Products, 2013, vol. 46, p. 399-403.*
He, Zhongqi et al., Adhesive properties of water-washed cottonseed meal on four types of wood, Journal of Adhesion Science and Technology, (2016), 30(19): 2109-2119.
He, Zhongqi et al., Pilot-Scale Production of Washed Cottonseed Meal and Co-Products, Modern Applied Science, 10 (2): 1913-1844 and 10(2): 1913-1852.
Cheng, H.N. et al., Investigation of modified cottonseed protein adhesives for wood composites, Industrial Crops and Products, (2013), 46:399-403 .
He, Zhongqi et al., Effects of Vigorous Blending on Yield and Quality of Protein Isolates Extracted From Cottonseed and Soy Flours, Modern Applied Science, (2013), 7(10): 1913-1844 and 7(10):1913-1852.
He, Zhongqi et al., Sequential Fractionation of Cottonseed Meal to Improve Its Wood Adhesive Properties, J Am Oil Chem Soc, (2014), 91:151-158.
He, Zhongqi et al., Comparison of adhesive properties of water-and phosphate buffer-washed cottonseed meals with cottonseed protein isolate on maple and poplar veneers, International Journal of Adhesion and Adhesives, (2014), 50:102-106.
Cheng, H.N. et al., Use of additives to enhance the properties of cottonseed protein as wood adhesives, International Journal of Adhesion and Adhesives, (2016), 68:156-160.
Cheng, H.N. et al., Soy and cottonseed protein blends as wood adhesives, Industrial Crops and Products, (2016), G Model INDCRO-8592; p. 7.
Lin, Hailin et al., Cow blood adhesive: Characterization of physicochemical and adhesion properties, International Journal of adhesion & Adhesives, (2010), 30:139-144.
Li, Nigbo et al., Physicochemical Properties and Adhesion Performance of Canola Protein Modified with Sodium Bisulfite, J. Am Oil Chem Soc., (2012), 89:897-908.

(Continued)

*Primary Examiner* — Robert Jones, Jr.
(74) *Attorney, Agent, or Firm* — John Fado; G. Byron Stover (57) ABSTRACT

An adhesive composition containing cottonseed protein, and one or more of the following components: (i) soy protein, (ii) a polysaccharide, and (iii) at least one modifier selected from a carboxylic acid, a dicarboxylic acid, a phosphorus-containing acid or ester, a cationic amino acid, a quaternary ammonium salt, or mixtures thereof.

27 Claims, 1 Drawing Sheet

(56) References Cited

OTHER PUBLICATIONS

Coltelli, Maria-Beatrice et al., State of the Art in the Development and Properties of Protein-Based Films and Coatings and Their Applicability to Cellulose Based Products: An Extensive Review,Coatings, (2016), 6:1-59.

Martinez, Wilda H., et al., Symposium on Synthetics and Substitutes for the Food Industry, J. Agr. Food Chem, (1970), 18(6): 961-968.

Dowd, Michael K. et al., Preparation and Characterization of Protein Isolate from Glandless and Glanded Cottonseed, American Chemical Society in Green Polymer Chemistry: Biocatalysis and Materials II, (2013), pp. 344-357.

Meyer, Edwin W., et al., Oilseed Protein Concentrates and Isolates, Journal of the American Oil Chemists' Society, (1971), 48:484-489.

Lorenz, Linda et al., Soy Flour Adhesive Strength Compared with That of Purified Soy Proteins*, Forest Products Society, Forest Products Journal, (2015), 65(1/2): 26-30.

Huang. Jian et al., A New Soy Flour-Based Adhesive for Making Interior Type II Plywood, J Am Oil Chem Soc, (2008), 85:63-70.

Huang, Weining et al., Adhesive Properties of Soy Proteins Modified by Urea and Guanidine Hydrochloride, JAOCS, (2000), 77(1):101-104.

Huang, Weining et al., Adhesive Properties of Soy Proteins Modified by Sodium Dodecyl Sulfate and Sodium Dodecylbenzene Sulfonate, (2005), JAOCS, 77(7):705-708.

Liu, Yuan et al., Chemical Modification of Soy Protein for Wood Adhesives, Macromolecular Rapid Communications, (2002), 23(13): 739-742.

Hogan,Joseph T., et al., Cottonseed and Peanut Meal Glues. Resistance of Plywood Bonds to Chemical Reagents, The Journal of the American Oil Chemists' Society, (Jan. 1952).

Liu, Yuan et al., Development and characterization of adhesives from soy protein for bonding wood, International Journal of Adhesion & Adhesives, (2007) 27:59-67.

Roe, Edward T. et al., Fatty Acid Amides. IV. Reaction of Fats With Ammonia and Amiines, The Journal of the American Oil Chemists' Society, (Jan. 1952), p. 18.

Chen, Minzhi et al., Improving Water Resistance of Soy-Protein Wood Adhesive by Using Hydrophilic Additives, BioRourcess, (2015), 10(1): 41-54.

Li, Kaichang et al., Investigation of Soy Protein-Kymene Adhesive Systems for Wood Composites, JAOCS, (2004), 81 (5): 487-491.

Jurgens, Julian F. et al., Lipide Content of Rice Bran, The Journal of the American Oil Chemists' Society, (Jan. 1951), p. 23.

Kalapathy, U., et al., Modification of Soy Proteins and Their Adhesive Properties on Woods, JAOCS, (1995), 72 (5):507-510.

Hogan, Joseph T. et al., Preparation and Utilization of Cottonseed Meal Glue for Plywood, The Journal of the American Oil Chemists' Society, (Jan. 1951), pp. 20-22.

Sun, Xiuzhi et al., Shear Strength and Water Resistance of Modified Soy Protein Adhesives, (1999), 76(8):977-980.

Lorenz, Linda et al., Soy Flour Adhesive Strength Compared with That of Purified Soy Proteins, Forest Products Journal, (2015), 65(1/2):26-30.

Frihart, Charles R. et al., Soy Properties and Soy Wood Adhesives, American Chemical Society, (2014), Ch. 8, pp. 167-192.

Zhang, Yuehong et al., Water-Resistant Soybean Adhesive for Wood Binder Employing Combinations of Caustic Degradation, Nano-Modification, and Chemical Crosslinking, BioResources, (2013), 8(1):1283-1291.

Chen, Nairong et al., Water resistances and bonding strengths of soy-based adhesives containing different carbohydrates, Industrial Crops and Products, (2013), 50:44-49.

* cited by examiner

ADHESIVE COMPOSITIONS AND METHODS OF ADHERING ARTICLES TOGETHER

BACKGROUND OF THE INVENTION

Disclosed herein are adhesive compositions containing cottonseed protein, and one or more of the following components: (i) soy protein, (ii) a polysaccharide, or (iii) at least one modifier selected from a carboxylic acid, a dicarboxylic acid, a phosphorus-containing acid or ester, a cationic amino acid, a quaternary ammonium salt, or mixtures thereof. Also disclosed are processes for producing an adhesive composition, involving mixing cottonseed protein and one or more of the following components: (i) soy protein, (ii) a polysaccharide, and (iii) at least one modifier selected from a carboxylic acid, a dicarboxylic acid, a phosphorus-containing acid or ester, a cationic amino acid, a quaternary ammonium salt, or mixtures thereof, and optionally (iv) water, plasticizer, or mixtures thereof. Furthermore, there are disclosed methods of bonding a first article to a second article, involving (a) producing an adhesive composition by mixing cottonseed protein, and at least one the following components: (i) soy protein, (ii) a polysaccharide, and (iii) at least one modifier selected from a carboxylic acid, a dicarboxylic acid, a cationic amino acid, a quaternary ammonium salt, or mixtures thereof, and optionally (iv) water, plasticizer, or mixtures thereof, at a pH of about 4 to about 12 and at a temperature of about 20° to about 60° C.; (b) depositing on a surface of the first article the adhesive composition thereby creating a binding area; and (c) contacting the binding area with a surface of the second article; and (d) applying heat and pressure to bond the first article to the second article.

The global wood adhesives and binders market is valued at $13.15 billion with a volume of 16,200 kilo tons in 2013 (Transparency Market Research, Wood adhesives and binders market—Global industry analysis, size, share, growth, trends and forecast, 2014-2020; 2014, http://www.transparencymarketresearch.com). Most wood adhesives currently in use are based on urea-formaldehyde, melamine-urea-formaldehyde, or phenol-formaldehyde resins. In order to decrease the usage of formaldehyde and petroleum-derived raw materials, there has been a partial shift in the past 15 years towards more eco-friendly bio-based wood adhesives, e.g., those based on soy and cellulose (Pizzi, A., J. Adhes. Sci. Technol., 20(8): 829-846 (2006); Kumar, R., et al., Ind. Crop Prod., 16: 155-172 (2002); Wang, D., et al., Trans ASABE, 52: 173-177 (2009); Frihart, C. R., and M. J. Birkeland, Am. Chem. Soc. Symp. Series, 1178: 167-192 (2014)). In particular, soy protein seems to be increasingly accepted in wood adhesive formulations (Sun, S., and K. Bian, J. Am. Oil Chem. Soc., 76: 977-980 (1999); Kalapathy, U., et al., J. Am. Oil Chem. Soc., 72: 507-510 (1995)) with several products having been commercialized (Li, K., et al., J. Am. Oil Chem. Soc., 81:487-491 (2004); Allen, A. J., et al., Forest Prod. J., 60(6): 534-540 (2010); Orr, L., Wood adhesives—A market opportunity study, Omni Tech International, Ltd., Midland, Mich., 2007, http://www.soynewuses.org/downloads/reports/final_WoodAdhesives-MarketOpportunity.pdf).

Cottonseed protein isolate can be prepared from defatted cottonseed meal by alkaline extraction followed by acidic precipitation (Berardi, L. C., et al., Food Tech., 23: 75-82 (1969); Martinez, W. H., et al., J. Agric. Food Chem., 18: 961-968 (1970)). In a previous work, we showed that cottonseed protein isolate exhibited superior adhesive strength and improved hot water resistance relative to soy protein isolate when used to bind maple wood veneer (Cheng, H. N., et al., Ind. Crops Prod., 46: 399-403 (2013)). In a follow-up study, sequential fractionation of cottonseed meal was studied and it was found that the adhesive properties of water and phosphate-buffer washed solid fractions were almost as good as cottonseed protein isolate (He, Z., et al., J. Am. Oil Chem. Soc., 91: 151-158 (2014)). These fractions were later tested on maple and poplar veneers with similar results (He, Z., et al., Int. J. Adhes. Adhes., 50: 102-106 (2014)).

Modification of protein formulations with alkali, guanidine hydrochloride, sodium dodecyl sulfonate, and urea has been shown to affect the adhesive properties of soy protein (Cheng, H. N., et al., 2013; Sun, S., and K. Bian, 1999; Hettiarachchy, N. S., et al., J. Am. Oil Chem. Soc., 72:1461-1464 (1995); Huang, W., and X. Sun, J. Am. Oil Chem. Soc., 77:101-104 (2000); Huang, W., and X. Sun, J. Am. Oil Chem. Soc., 77:705-708 (2000)) and cottonseed protein (Cheng, H. N., et al., 2013). Other modifiers previously studied with soy proteins included various plasticizers (Mo, X., and X. Sun, J. Am. Oil Chem. Soc., 79: 197-202 (2002)), ethylene glycol and its polymers (Chen, M., et al., BioResources, 10: 41-54 (2015)), cationic polyacrylamide (Xu, H., et al., BioResources, 9: 4667-4678 (2014)), clay (Zhang, Y., et al., BioResources, 8: 1283-1291 (2013)), calcium carbonate (Liu, D., et al., Bioresource Technol., 101: 6235-6241 (2010)), and combinations of acid, base, and salt (Lin, Q., et al., Int. J. Adhes. Adhes., 34: 11-16 (2012)).

In the present study, we developed adhesive compositions containing cottonseed protein and other components and surprisingly found that they exhibited improved adhesive strength.

SUMMARY OF THE INVENTION

Disclosed herein are adhesive compositions containing cottonseed protein, and one or more of the following components: (i) soy protein, (ii) a polysaccharide, or (iii) at least one modifier selected from a carboxylic acid, a dicarboxylic acid, a phosphorus-containing acid or ester, a cationic amino acid, a quaternary ammonium salt, or mixtures thereof. Also disclosed are processes for producing an adhesive composition, involving mixing cottonseed protein and one or more of the following components: (i) soy protein, (ii) a polysaccharide, and (iii) at least one modifier selected from a carboxylic acid, a dicarboxylic acid, a phosphorus-containing acid or ester, a cationic amino acid, a quaternary ammonium salt, or mixtures thereof, and optionally (iv) water, plasticizer, or mixtures thereof. Furthermore, there are disclosed methods of bonding a first article to a second article, involving (a) producing an adhesive composition by mixing cottonseed protein, and at least one the following components: (i) soy protein, (ii) a polysaccharide, and (iii) at least one modifier selected from a carboxylic acid, a dicarboxylic acid, a cationic amino acid, a quaternary ammonium salt, or mixtures thereof, and optionally (iv) water, plasticizer, or mixtures thereof, at a pH of about 4 to about 12 and at a temperature of about 20° to about 60° C.; (b) depositing on a surface of the first article the adhesive composition thereby creating a binding area; and (c) contacting the binding area with a surface of the second article; and (d) applying heat and pressure to bond the first article to the second article.

This summary is provided to introduce a selection of concepts in a simplified form that are further described below in the detailed description. This summary is not intended to identify key features or essential features of the

DETAILED DESCRIPTION OF THE INVENTION

Disclosed herein are adhesive compositions that can be used for bonding wood veneers, wood layers, wood fibers, and wood particulates, or for manufacturing composite wood products. The adhesive compositions contain cottonseed protein and one of the following components: (i) soy protein, (ii) a polysaccharide, or (iii) at least one modifier selected from carboxylic acids, dicarboxylic acids, phosphorus-containing acids or esters, cationic amino acids, quaternary ammonium salts, or mixtures thereof.

Cottonseed protein includes cottonseed protein isolate, cottonseed protein concentrate, cottonseed protein meal and flour, water-washed cottonseed protein meal and flour, and buffer-washed cottonseed protein meal and flour. Soy protein includes soy protein isolate, soy protein concentrate, soy protein flour, and water-washed soy protein flour. Although a fair amount of variation occurs depending on the procedures used, in general a protein meal contains about 40% (e.g., 40%) protein, a protein flour contains about 50% (e.g., 50%) protein, a protein concentrate contains about 70% (e.g., 70%) protein, and a protein isolate contains about 90% (e.g., 90%) protein. Through appropriate washing with water or buffer (e.g., sodium phosphate), the protein content of protein meal or flour may be increased.

Polysaccharides are polymers of saccharides, and they contain approximately 10 or more units of monosaccharide covalently bonded together. They can form linear or branched polymeric structures, and they can be broken down to monosaccharides or oligosaccharides through hydrolysis. Some common polysaccharides include hemicellulose (e.g., xylan), starch (e.g., pregelatinized starch), and cellulose.

The carboxylic acid includes acetic acid, propionic acid, butyric acid, valeric acid, and caproic acid. The dicarboxylic acid includes oxalic acid, malonic acid, succinic acid, glutaric acid, and adipic acid. The phosphorus-containing acids include phosphoric acid, phosphorous acid, metaphosphoric acid, methylphosphonic acid, octadecylphosphonic acid, trimetaphosphoric acid, pyrophosphoric acid, polyphosphoric acid, or phytic acid. The phosphorus-containing esters include bis(2-ethylhexyl) phosphate, sodium monododecyl phosphate, and diethyl phosphite. The cationic amino acid includes arginine. The quaternary ammonium salt includes choline chloride.

The adhesive compositions may further contain water or plasticizer at about 10 to about 98% by weight (e.g., 10 to 98% by weight) of the entire composition. A plasticizer is an additive that improves a material's flexibility, workability, and/or durability. Plasticizers for proteins include glycerol, sorbitol, and polyethylene glycol.

The adhesive compositions described herein can be used in a variety of different applications, which include, for example, bonding together many different types of wood substrates and/or creating composite wood materials.

The adhesive compositions may be produced by mixing cottonseed protein and one or more of the following components: (i) soy protein, (ii) a polysaccharide, or (iii) at least one modifier selected from a carboxylic acid, a dicarboxylic acid, a phosphorus-containing acid or ester, a cationic amino acid, a quaternary ammonium salt, or mixtures thereof, and optionally (iv) water, plasticizer, or mixtures thereof.

Also disclosed are methods of bonding a first article to a second article. The methods involve the steps of (a) depositing on a surface of the first article any one of the foregoing adhesive compositions thereby to create a binding area; and (b) contacting the binding surface with a surface of the second article thereby to bond the first surface to the second surface. The method optionally also comprises the step of, after step (b), permitting the adhesive composition to cure, which can be facilitated by the application of pressure, heat or both pressure and heat.

The adhesive compositions can be applied to the surfaces of substrates in any conventional manner. Alternatively, the surfaces can be coated with the composition by spraying, or brushing, doctor blading, wiping, dipping, pouring, ribbon coating, combinations of these different methods, and the like.

In addition, there are disclosed methods of producing a composite material. The method involve the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

In certain embodiments, the first article, the second article, or both the first and second articles are lignocellulosic materials, or composite materials containing lignocellulosic material. The first article, the second article, or both the first and second articles can comprise a metal, a resin, a ceramic, a polymer, a glass or a combination thereof. The first article, the second article, or both the first article and the second article can be a composite. In addition, provided are articles produced by each of the foregoing methods of manufacture.

In addition, there is provided articles comprising two or more components bonded together using one or more of the adhesive compositions described herein. The bonded components can be selected from the group consisting of paper, wood, glass, metal, fiberglass, wood fiber, ceramic, ceramic powder, plastic (for example, a thermoset plastic), and a combination thereof. In certain other embodiments, the bonded components can be selected from the group consisting of paper, wood, glass, metal, fiberglass, wood fiber, ceramic, ceramic powder, sand, plastic (for example, a thermoset plastic), and a combination thereof. Also provided are articles (for example, a composite material, laminate, or a laminate containing composite material) produced using one or more of the adhesive compositions described herein.

The composite material can be chip board, particle board, fiber board, plywood, laminated veneer lumber, glulam, laminated whole lumber, laminated composite lumber, composite wooden I-beams, medium density fiberboard, high density fiberboard, orientated strand board, extruded wood, or fiberglass. The composite can be a thermosetting composite or a thermoplastic composite.

In certain embodiments, the article is a composite, such as a random non-oriented homogeneous composite, an oriented composite, or a laminated composite.

In certain embodiments, the article comprises a lignocellulosic component. Furthermore, the article can comprise paper, wood, glass, fiberglass, wood fiber, ceramic, ceramic powder, or a combination thereof.

In certain embodiments, the article is a particle board composite. The amount of wood and adhesive composition used to prepare the particle board composite can be adjusted to optimize the performance properties of the particle board for different applications (e.g., outdoor use where increased water resistance is desirable). In certain embodiments, the composite comprises at least about 80% (w/w) wood, at least about 90% (w/w) wood, at least about 95% (w/w) wood, or at least about 98% (w/w) wood.

The adhesives described herein can be used in the production of a variety of wood-based products including composite materials, laminates, and laminates that contain composite materials. For example, the adhesives can be used in the production of consolidated wood composites, for example, chipboard (also known as OSB), fiberboard, and related composite wood products, as well as in the production of engineered lumber composites, for example, I-beams (I-joists), laminated veneer lumber (LVL), and other types of structural lumber composites.

The invention also provides a method of producing a composite material. The method comprises the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

The terms "substrate", "adhered" and "article" are interchangeable and refer to the substances being joined, bonded together, or adhered using the methods and compositions described herein. In certain embodiments, the first article, the second article or both the first and second articles are lignocellulosic materials, or composite materials containing lignocellulosic material. Furthermore, the first article, the second article or both the first and second articles can comprise a metal, a resin, a ceramic, a polymer, a glass or a combination thereof. It is understood that the first article, the second article, or both the first article and the second article can be a composite.

The compositions can be used to bond multiple lignocellulosic materials (adherends) together to prepare composite wood products. Furthermore, it is understood that at least one of the adherends bonded together and/or included in the composite can be wood, wood fiber, paper, rice hulls, fiberglass, ceramic, ceramic powder, plastic (for example, thermoset plastic), cement, stone, cloth, glass, metal, corn husks, bagasse, nut shells, polymeric foam films or sheets, polymeric foams, fibrous materials, or combinations thereof.

The amount of adhesive composition applied to the adhesive bond between substrates may vary considerably from one end use application, or type of adhesive used, or type of substrate, to the next. The amount of adhesive should be sufficient to achieve the desired bond strength and bond durability under a given set of test conditions.

The amount of an adhesive composition applied may be in the range of from about 1 to about 30 grams per square foot (e.g., 1 to 30 grams per square foot), preferably from about 3 to about 20 grams per square foot (e.g., 3 to 20 grams per square foot), more preferably from about 5 to about 10 grams per square foot (e.g., 5 to 10 grams per square foot) of bond surface area (i.e., the bond surface area being the area of overlap between the substrates to be bonded by the adhesive composition).

The adhesive compositions can be used to fabricate multi-substrate composites or laminates, particularly those comprising lignocellulosic or cellulosic materials, such as wood or paper. The adhesives can be used to prepare products such as plywood, laminated veneer lumber (LVL), waferboard (also known as chipboard or OSB), particle board, fiberboard, fiberglass, composite wooden I-beams (I-joists), and the like.

The adhesive compositions can also be used to fabricate composite materials, which include, for example, chip board, particle board, fiber board, plywood, laminated veneer lumber, glulam, laminated whole lumber, laminated composite lumber, composite wooden I-beams, medium density fiberboard, high density fiberboard, extruded wood, or fiberglass.

Under certain circumstances, pressure and/or heat can be used to facilitate curing. The amount of pressure and the time period for which the pressure is applied are not limited and specific pressures and times will be evident to one skilled in the art from the present disclosure (see the various Examples). In certain embodiments, a pressure of about 0.4 MPa to about 14 MPa (e.g., 0.4 MPa to 14 MPa) is applied from about 2 minutes to about 2 hours (e.g., 2 minutes to 2 hours), preferably from about 10 minutes to about 2 hours (e.g., 10 minutes to 2 hours), preferably from about 2 minutes to about 30 minutes (e.g., 2 minutes to 30 minutes), or more preferably from about 5 minutes to about 30 minutes (e.g., 5 minutes to 30 minutes) (depending on the temperature). The pressure, heating, or application of both pressure and heat may promote curing and also decrease the viscosity adhesive compositions described herein, facilitating their flow in the contact area, such that a bonding region is created whereby there is a continuum between the adherends. The amount of pressure, heat time or their combination can be optimized to ensure such continuum and will depend on the adherends' physical or chemical properties as well as on the rate of the adhesive's viscosity-build throughout the cure cycle.

Other compounds may be added to the composition provided they do not substantially interfere with the intended activity and efficacy of the composition; whether or not a compound interferes with activity and/or efficacy can be determined, for example, by the procedures utilized below.

The amounts, percentages and ranges disclosed herein are not meant to be limiting, and increments between the recited amounts, percentages and ranges are specifically envisioned as part of the invention.

"Optional" or "optionally" means that the subsequently described event or circumstance may or may not occur, and that the description includes instances in which said event or circumstance occurs and instances where it does not. For example, the phrase "optionally comprising a modifier" means that the composition may or may not contain a modifier and that this description includes compositions that contain and do not contain a modifier.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

Unless defined otherwise, all technical and scientific terms used herein have the same meaning as commonly understood by one of ordinary skill in the art to which the invention belongs. As used herein, the term "about" refers to a quantity, level, value or amount that varies by as much as 10% to a reference quantity, level, value or amount. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Materials: The term "cottonseed protein isolate" as used herein refers to an isolate prepared from defatted cottonseed meal using the single-step alkaline extraction acid precipitation procedure reported in the literature (Berardi, L. C., et al., 1969; Martinez, W. H., et al., 1970). Typically, 50 g of cottonseed meal was dispersed with moderate stirring into 750 mL of 0.027 N sodium hydroxide solution for 30 minutes. The resulting slurry was partitioned into centrifuge bottles and the solids were pelleted by centrifugation for 10 minutes at 10,000 g. The pH of the combined supernatants was adjusted to 5.0 with 1 N hydrochloric acid, which caused the protein to precipitate. The protein was then recovered by centrifugation, washed with water, centrifuged again, and then freeze-dried. The nitrogen content of this material was about 16.0%. When 3 g of the cottonseed protein product was dispersed in 25 g water, the slurry pH was about 5.0.

Soy protein isolate (Pro-Fam® 781) was provided by Archer Daniels Midland Company (Decatur, Ill.). The nitrogen content was 14.2%. When 3 g of this protein was dispersed in 25 g water, the pH was 6.75.

Other reagents were purchased from Sigma Aldrich (Milwaukee, Wis.) and used without further purification.

Maple, walnut, pine, and cherry wood veneer were acquired from Oakwood Veneer Company (Troy, Mich.). The maple veneer from Oakwood had a thickness of 0.6 mm. A thicker maple veneer (1.57 mm) from Certainly Wood, Inc. (East Aurora, N.Y.) was also used in some of the examples.

Preparation of Protein Adhesives and Bonded Wood Samples: The formulation of adhesives was adapted from those reported in the literature (Sun, S., and K. Bian, 1999; Zhong, Z., et al., Int. J. Adhes. Adhes., 22: 267-272 (2002); Sun, X. S., et al., Adhesion performance of modified soy protein adhesive, DOD report, 2002, http://dodreports.com/pdf/ada414303.pdf; Liu, Y., and K. Li, Macromol. Rapid Comm., 23: 739-742 (2002)). Adhesive preparations comprised 3 g protein (or protein blend) and 25 mL distilled water and were stirred for 2 h at room temperature. In formulations containing polysaccharides, 3 g of a blend of protein and polysaccharide (with different weight ratios) were dispersed in 25 mL distilled water. For formulations containing modifiers, the protein (3 g) and modifier (between 30 and 500 mM final concentration) was suspended in 25 g distilled water and stirred for 1 h (Zhong, Z., et al., 2002; Sun, X. S., et al., 2002). The pH for each modifier preparation was adjusted with sodium hydroxide or hydrochloric acid to the same value as that of the protein by itself.

The adhesive preparations were applied to pieces of wood veneer (Li, K., et al., 2004; Liu, Y., and K. Li, 2002). Wood veneer was cut into strips 0.5 in. wide by 3.5 in. long with the wood grain parallel to the long dimension. The adhesive preparation was applied to one side and one end of the wood veneer strip, covering an area of 0.5 in.×1 in. After 10 minutes of air drying, a second layer of adhesive was applied over the first layer. Two wood veneer strips were then stacked with the adhesive sections overlapping to generate a bonded area of 0.5 in×1 in. The two strips were then hot-pressed for 20 min at 80° C. and 2.76 MPa. Ten bonded composites were prepared and tested for each adhesive preparation.

Measurement of adhesive strength: The tensile shear strength of the bonded specimens was measured with a Zwick stress tester (Zwick GmbH & Co., Ulm, Germany). The crosshead speed was 1 mm/min. The maximum shear strength at break (in MPa) was reported as the bond strength (or adhesive strength) of the adhesive applied. Ten bonded strips were tested for each formulation studied and the mean and the standard deviations were calculated. Analysis of variance was used to compare differences in adhesive performance (SAS Institute, Cary, N.C.).

Water resistance of the wood composites: The procedure was similar to that previously used (Cheng, H. N., et al., 2013) as adapted from previous studies (Liu, Y., and K. Li, Int. J. Adhes. Adhes., 27: 59-67 (2007); Zhong, Z., et al., J. Appl. Polym. Sci., 130: 2261-2270 (2007)) and ASTM D1151-00 (ASTM 2013, Standard practice for effect of moisture and temperature on adhesive bonds (D1151-00), American Society of Testing and Materials, Philadelphia, Pa., pp. 73-75). For this test the wood veneers were cut into strips with the dimensions of 1.0 in×3.5 in. Each adhesive preparation was applied twice to the 1 in. end of the wood side of each veneer strip. Pairs of maple strips were overlapped and hot-pressed for 10 min at 100° C. and 1.38 MPa. After cooling, the bonded wood strips were heated in water for 4 h at 63±3° C. and dried at room temperature for 24 h. The bonded pairs were heated again in water for 4 h at 63±3° C. and then cooled with tap water. They were then air-dried for 24 h and evaluated on the Zwick stress tester for the maximum tensile shear strength. Ten bonded composites were tested for each adhesive preparation.

Results and Discussion. Different wood types: In an earlier work we showed that cottonseed protein isolate gave better performance on maple veneer than did soy protein isolate (Cheng, H. N., et al., 2013) and later we studied the adhesive behavior on poplar veneers (He, Z., et al., 2014). It would be useful to see if the favorable performance of cottonseed protein can be observed on pine, walnut, and cherry wood veneers. Under the testing conditions we found that the results were similar irrespective of wood type (Table 1, column 3) and that cottonseed protein surprisingly showed better adhesive strength than soy protein for all these wood veneer types.

The hot water resistance data for these proteins and wood veneers are shown in Table 1, column 4. Cottonseed protein isolate surprisingly gave greater adhesive strength than soy protein after hot water treatment for all wood types. Some wood types (e.g., walnut) appeared to give slightly better adhesive strength after hot water treatment than the other tested wood types. In the literature different adhesion values on soy proteins for several wood types have been reported and the differences were attributed to the roughness or smoothness of the wood surfaces (Sun, S., and K. Bian, 1999; Kalapathy, U., et al., 1995).

Figure 1:
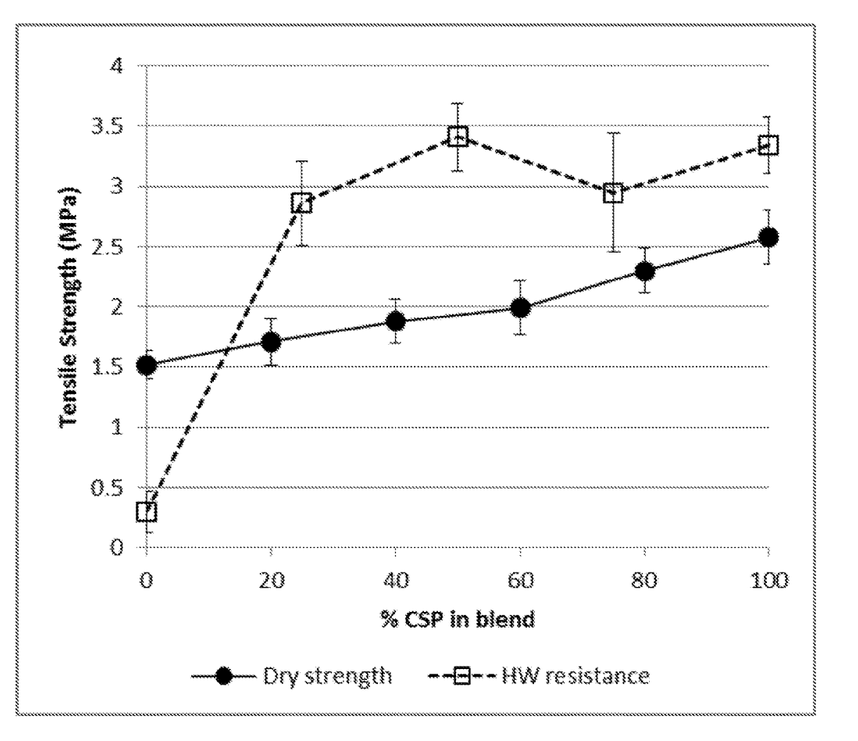
FIG. 1 shows dry adhesive strength and hot water (HW) resistance of cottonseed protein (CSP) and soy protein blends shown by the maximal tensile shear strength at break of the bonded strip pairs as described below.

Protein Blends: The results of blending cottonseed and soy proteins are shown in FIG. 1. As the percentage of cottonseed protein increased in the blend, there was surprisingly a steady increase in dry tensile strength. Surprisingly, a 20% cottonseed protein addition increased the hot water resistance of soy protein to a significantly higher value (from 0.5 MPa to 2.8 MPa). Thus, cottonseed protein can be used as an effective additive to increase the adhesive performance of soy protein.

Blends of Proteins with Polysaccharides: The adhesive strength results for blends of cottonseed protein with xylan are shown in Table 2. Relative to cottonseed protein, xylan alone had a lower dry adhesive strength (1.12 MPa) and no hot water resistance. When cottonseed proteins and xylan were blended, the adhesive strength of cottonseed protein formulation was surprisingly retained with up to about 40-50% xylan in the blend for both dry tensile strength (about 2.4 MPa) and hot water resistance (about 3 MPa). In contrast, soy protein/xylan blends have much lower values for adhesive strength and hot water resistance (about 1.4 MPa and 0.3 MPa respectively), and the formulation with 40% or higher xylan levels failed during hot water treatment.

Starch by itself had relatively weak adhesive properties with an adhesive strength of 0.74 MPa (Table 3). However, when blended with proteins, reasonable protein adhesive performance (both dry and hot water tests) was surprisingly maintained with as much as 75% starch in the blend. This occurred for both protein types, although cottonseed protein surprisingly gave notably higher values than did soy protein. As starch is generally cheaper than protein, this can represent a potential cost improvement in some applications.

As for the blend of cottonseed protein with cellulose (Table 4), roughly the same observations were found as for protein/starch blends. Approximately the same cottonseed protein adhesive performance (both dry and hot water tests) was surprisingly maintained with as much as 75% cellulose in the blend. However, for soy protein, the adhesive properties are only maintained at about 25% cellulose level. At 50% or higher cellulose levels, the dry tensile decreases and the adhesive failed during hot water treatment. In all three polysaccharides (i.e., xylan, starch and cellulose), the ability of cottonseed protein to maintain its high adhesive performance with 50-75% of polysaccharide present was a surprising discovery.

Modifiers for Proteins: Two types of modifiers were tested to see if they affected the adhesive properties of both types of protein isolates. The first modifiers tested included amino acids and fatty acids. The amino acids tested included neutral charged acids (i.e., glycine, leucine, tyrosine), potentially cationically charged amino acids (i.e., arginine, histidine, and lysine), potentially anionically charged amino acids (i.e., aspartic and glutamic acids), and amino acids having an aliphatic side chain (i.e., leucine) or aromatic side chain (i.e., tyrosine). Three fatty acids were included: oleic acid, palmitic acid, and stearic acid. In order to further evaluate the effect of cationic and anionic compounds, choline chloride, acetic acid, butyric acid, and adipic acid were also tested. For consistency, the formula names of the modifiers are given even though, at the pH involved, the amino acids were mostly in the zwitterionic form and the acids were mostly in the form of acid salts.

In an initial experiment, each modifier was added at 0.5 M concentration, and the pH was adjusted to be the same as the protein by itself with either NaOH or HCl. From the data for the cottonseed protein with modifiers (Table 5), it appeared that the amino acids without ionic charges (i.e., glycine, tyrosine, leucine), amino acids with ionizable cationic charges (i.e., histidine, lysine), and the long-chain fatty acids (i.e., stearic, palmitic, and oleic) showed no benefit to adhesive strength. However, smaller molecules that carry anionic charges (i.e., aspartic acid, glutamic acid, acetic acid, adipic acid, and butyric acid) surprisingly showed enhanced adhesive strength relative to cottonseed protein control. Modifiers that carry non-ionizable cationic charges (arginine and choline chloride) also surprisingly appeared to have a positive effect on the adhesive strength of cottonseed protein.

Different results were obtained for soy protein isolate (Table 5). Aspartic acid, glutamic acid, butyric acid, acetic acid, and adipic acid, as well as arginine and choline chloride produced similar tensile strength values as soy protein isolate itself (tensile strength 1.50 MPa). For both soy protein and cottonseed protein, glycine (as the structurally simplest amino acid) had no apparent effect on the adhesive strength of the protein formulation.

In order to confirm these results and to better understand the observations, we carried out dosage-dependent studies on selected modifiers: aspartic acid, glutamic acid, arginine, choline chloride, butyric acid, and adipic acid. Acetic acid was not tested because of its structural similarity to butyric and adipic acid. The results for cottonseed protein are shown in Table 6. For the cottonseed protein isolate with these tested modifiers, a 0.1 to 0.5 M concentration range surprisingly gave the strongest enhancement with the results decreasing at lower and higher doses. The modifiers with the most enhancements on cottonseed protein were surprisingly aspartic acid, adipic acid, glutamic acid, and butyric acid. The enhancement effect of arginine and choline chloride on cottonseed protein was significant but weaker than the enhancement achieved by the other compounds. For soy protein isolate (Table 6), many of the modifiers had values of adhesive strength values near those of the soy protein isolate used alone.

In view of the adhesive strength results given in Table 6, hot water resistance tests were carried out on cottonseed and soy protein isolates with aspartic, glutamic, butyric, adipic, and acetic acids, and with arginine. Each of the modifiers was added at 0.5M concentration to the protein and the pH was adjusted to be the same as the protein without modifier. The results are given in Table 7. The good hot water resistance feature of cottonseed protein was surprisingly retained in the presence of these six modifiers. In contrast, surprisingly the hot water resistance of soy protein isolate seemed to be negatively impacted by these modifiers, with arginine showing the biggest impact with all the adhesive joints failing during the heat soak treatment.

The second group of modifiers tested were phosphorus-containing acids and esters. These compounds contain either a single phosphorus atom (e.g., phosphoric acid, phosphorous acid, metaphosphoric acid, methylphosphonic acid, octadecylphosphonic acid), esters of phosphorus-containing acids (e.g., bis(2-ethylhexyl) phosphate, sodium monododecyl phosphate, diethyl phosphite), or acids containing multiple phosphorus atoms (e.g., sodium trimetaphosphate, tetrapotassium pyrophosphate, polyphosphoric acid, sodium salt, phytic acid). These modifiers were tested at four concentrations (i.e., 27, 54, 89, and 446 mM) with both cottonseed protein and soy protein. A dependence of the adhesive strength on the dosage level was found for each additive (Table 8). For the mono-phosphorus acids the optimal level was generally around 54 mM, but for the esters and the multi-phosphorus acids the optimal level was about 27 mM. The maximum improvement (at the optimal level of each additive) is given in the last column of Table 8. The greatest improvements were surprisingly observed for methyl phosphonic acid, phosphorous acid, and phosphoric acid, with, respectively, 47, 44, and 42% increase in adhesive strength. Although the performance of the other phosphorus containing compounds with cottonseed protein was less, it was still surprisingly significant, with adhesive strength improvements between 11 and 32%.

In contrast, soy protein showed much less improvement with the same additives (Table 8). Only phosphoric acid, phosphorous acid, sodium trimetaphosphate and tetrapotassium pyrophosphate exhibited improvements, which ranged from 7 to 11% over the soy protein control, and it was unclear if these improvements were statistically relevant. Three of the additives, octadecyl phosphonic acid, sodium monododecyl phosphate, and polyphosphoric acid, showed reduced strength relative to the soy protein control.

Hot water resistance was studied for the eight cottonseed protein/modifier combinations and three soy protein/modifier combinations that produced the strongest joints. Each modifier was tested at its optimal concentration based on the dry strength results. Additionally, two different thicknesses of veneer were studied (Table 9). The first data set was based on the 0.6-mm thick maple veneer (column 3). For cottonseed protein with the modifiers, all the tensile strength values were statistically the same, and inclusion of each modifier did not negatively affect the hot water resistance of the adhesives. With these cottonseed-glued veneers, however, surprisingly significant numbers of wood breaks occurred during the tensile testing, which was due to the adhesive being stronger than the wood. Hence, these values give only a lower limit of strength. In contrast, surprisingly for soy protein adhesives only the 27 mM phosphoric acid modifier did not affect the hot water resistance. The use of sodium trimetaphosphate or tetrapotassium pyrophosphate (both at 27 mM) decreased the hot water resistance for the soy protein (Table 9).

The hot water resistance test results with the 1.59-mm maple veneer strips are shown in column 5, Table 9. For the cottonseed glued samples, the hot water-treated tensile strength was surprisingly improved by 10 to 46% (column 6, Table 9). The best tensile strength results were surprisingly obtained for metaphosphoric acid (46% over cottonseed protein control), phosphoric acid (40%), phosphorous acid (38%), and methyl phosphonic acid (37%). All of these thicker wood strips glued with the soy protein formulations (including the soy protein control) failed during the hot water soak so that no adhesive performance data were possible.

Conclusion: One embodiment of this invention is the blend of cottonseed protein and soy protein. We discovered that the addition of cottonseed protein to soy protein surprisingly increased the latter's tensile strength and hot water resistance. Another embodiment of this invention is the blend of cottonseed protein with a polysaccharide. Even with the blend of 50-75% by weight of an inexpensive polysaccharide like xylan, starch and cellulose, the cottonseed protein surprisingly maintained its adhesive properties. Yet another embodiment of this invention is the surprising discovery of two types of modifiers that can substantially improve the adhesive properties of cottonseed protein. Surprisingly, these modifiers do not exhibit the same benefits on soy protein.

For one type of modifier (several amino acids, fatty acids, and small molecules with anionic or cationic charges), compounds having an anionic charge in the formulations, e.g., aspartic acid, glutamic acid, acetic acid, butyric acid, and adipic acid, surprisingly exhibited the greatest effect. However, these same compounds surprisingly gave no significant improvement in the adhesive strength of soy proteins. Furthermore, these modifiers surprisingly had no negative impact on the hot water resistance of the cottonseed protein wood adhesive but decreased the hot water resistance of soy protein based formulations. Likewise, surprisingly we showed improved adhesive performance (tensile strength and hot water resistance) for cottonseed protein when several phosphorus-containing modifiers were included in the formulations. No such benefit was observed for soy protein and the same phosphorus-containing modifiers. Thus we have shown surprisingly improved results when the adhesive contains cottonseed protein isolate and a carboxylic acid (e.g., acetic acid, butyric acid), a dicarboxylic acid (e.g., adipic acid), a phosphorus-containing acid, a phosphorus-containing ester, or to a lesser extent, a cationic amino acid (e.g., arginine), or a quaternary ammonium salt (e.g., choline chloride). In view of these results, the combination of cottonseed protein and one of these modifiers should be beneficial in the future product development of protein wood adhesives.

All of the references cited herein, including U.S. Patents and U.S. Patent Application Publications, are incorporated by reference in their entirety. Also incorporated by reference in their entirety are the following references: U.S. Pat. No. 9,404,025; U.S. Pat. No. 9,416,303; U.S. Pat. No. 9,057,000; U.S. Pat. No. 9,428,673; diGioia, L., and S. Guilber, J. Agric. Food Chem., 47: 1254-1261 (1999); Fox, S. W., Naturwissenchaften, 56: 1-9 (1969); Han, H. J., Innovations in Food Packaging, Elsevier Academic Press, San Diego, 2005, p. 289; Harada, K., and S. W. Fox, Archiv. Biochem. Biophys., 86: 274-280 (1960); Li, J., et al., J. Phys. Chem. B, 116: 12284-12294 (2012); Lyutova, E. M., et al., Biotechnol. Prog., 23(6): 1411-1416 (2007); Tomita, S., et al., J. Phys.: Conf. Ser., 106: 012022 (2008); Waldron, T. T., et al., Protein Sci., 12(4): 871-874 (2003); He, Z., et al., Ind. Crops Prod., 61: 398-402 (2014).

Thus, in view of the above, there is described (in part) the following:

An adhesive composition, said adhesive composition comprising (or consisting essentially of or consisting of) cottonseed protein, and one or more of the following components: (i) soy protein, (ii) a polysaccharide, and (iii) at least one modifier selected from the group consisting of a carboxylic acid, a dicarboxylic acid, a phosphorus-containing acid or ester, a cationic amino acid, a quaternary ammonium salt, and mixtures thereof.

The above adhesive composition, wherein said cottonseed protein is selected from the group consisting of cottonseed protein isolate, cottonseed protein concentrate, cottonseed protein flour, water-washed cottonseed protein flour, buffer-washed cottonseed protein flour, and mixtures thereof.

The above adhesive composition, wherein said soy protein is selected from the group consisting of soy protein isolate, soy protein concentrate, soy protein flour, water-washed soy protein flour, buffer-washed soy protein flour, and mixtures thereof.

The above adhesive composition, wherein said polysaccharide is selected from the group consisting of hemicellulose, starch, cellulose, and mixtures thereof. The above adhesive composition, wherein said hemicellulose is xylan. The above adhesive composition, wherein said starch is pregelatinized starch.

The above adhesive composition, wherein said composition further comprises (iv) at least one member of the group consisting of water, plasticizer, and mixtures thereof (at about 30 to about 98% (e.g., 30 to 98%) by weight of the entire composition).

The above adhesive composition, wherein said plasticizer is selected from the group consisting of glycerol, sorbitol, polyethylene glycol, and mixtures thereof.

The above adhesive composition, wherein said carboxylic acid is selected from acetic acid, butyric acid, and mixtures thereof.

The above adhesive composition, wherein said dicarboxylic acid is adipic acid.

The above adhesive composition, wherein said phosphorus-containing acid is selected from the group consisting of phosphoric acid, phosphorous acid, metaphosphoric acid, methylphosphonic acid, octadecylphosphonic acid, trimetaphosphoric acid, pyrophosphoric acid, polyphosphoric acid, phytic acid, and mixtures thereof.

The above adhesive composition of claim 1, wherein said phosphorus-containing acid is in the form of a salt of sodium, potassium, or other cation (e.g., lithium, magnesium, and ammonium).

The above adhesive composition, wherein said phosphorus-containing ester is selected from the group consisting of bis(2-ethylhexyl) phosphate, sodium monododecyl phosphate, diethyl phosphite, and mixtures thereof.

The above adhesive composition, wherein said cationic amino acid is arginine.

The above adhesive composition, wherein said quaternary ammonium salt is choline chloride.

The above adhesive composition, where the cottonseed protein/soy protein weight ratio is from about 10:90 to about 90:10 by weight, the cottonseed protein/polysaccharide weight ratio is from about 10:90 to about 90:10 by weight, and the cottonseed protein/modifier weight ratio is from about 90:10 to about 99.5:0.5 by weight.

A process for producing an adhesive composition, said process comprising (or consisting essentially of or consisting of) mixing cottonseed protein and one or more of the following components: (i) soy protein, (ii) a polysaccharide, and (iii) at least one modifier selected from the group consisting of a carboxylic acid, a dicarboxylic acid, a phosphorus-containing acid or ester, a cationic amino acid, a quaternary ammonium salt, and mixtures thereof, and optionally (iv) at least one member of the group consisting of water, plasticizer, and mixtures thereof.

The above process, where the cottonseed protein/soy protein weight ratio is from about 10:90 to about 90:10 by weight, the cottonseed protein/polysaccharide weight ratio is from about 10:90 to about 90:10 by weight, and the cottonseed protein/modifier weight ratio is from about 90:10 to about 99.5:0.5 by weight.

The above process, wherein the pH of said process is from about 4 to about 12.

The above process, wherein said water or said plasticizer is present in an amount from about 30% (w/w) to about 98% (w/w) of the adhesive composition.

A method of bonding a first article to a second article, said method comprising (or consisting essentially of or consisting of) (a) producing an adhesive composition by mixing cottonseed protein, and at least one the following components: (i) soy protein, (ii) a polysaccharide, and (iii) at least one modifier selected from the group consisting of a carboxylic acid, a dicarboxylic acid, a cationic amino acid, a quaternary ammonium salt, and mixtures thereof, and optionally (iv) at least one member of the group consisting of water, plasticizer, and mixtures thereof, at a pH of about 4 to about 12 and at a temperature of about 20° to about 60° C.; (b) depositing on a surface of said first article said adhesive composition thereby creating a binding area; and (c) contacting said binding area with a surface of said second article; and (d) applying heat and pressure to bond said first article to said second article.

The above method, wherein said method comprises (d) applying heat at about 60° to about 200° C. and pressure at about 0.4 MPa to about 14 MPa for about 1 minute to about 90 minutes to bond said first article to said second article.

The above method, wherein said first article and said second article are selected from the group consisting of wood veneers, wood layers, wood fibers, and wood particulates.

An adhesive product comprising the above adhesive composition.

A product comprising a first article bonded to a second article by the above method.

A method of producing a composite material comprising: (a) combining wood strands, particles, fibers, or veneers with the adhesive composition of claim 1 to produce a mixture; and (b) curing (e.g., at about 80° to about 220° C. (80° to 220° C.), at about 0.4 to about 4 MPa (0.4 to 4 MPa)) the mixture produced by step (a) to produce the composite material.

An article comprising two or more components bonded together using the adhesive composition disclosed herein. The article wherein the bonded components are selected from the group consisting of paper, wood, glass, metal, fiberglass, wood fiber, ceramic, ceramic powder, plastic, and a combination thereof.

An article produced using the adhesive composition disclosed herein. The article wherein the article is a composite. The article wherein the article comprises paper, wood, glass, fiberglass, wood fiber, ceramic, ceramic powder, or a combination thereof. The article wherein the composite is chip board, particle board, fiber board, oriented strand board, plywood, laminated veneer lumber, glulam, laminated whole lumber, laminated composite lumber, composite wooden I-beams, medium density fiberboard, high density fiberboard, extruded wood, or fiberglass.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Adhesive properties of cottonseed protein (CSP) and soy protein (SP) isolates on different wood veneers shown by the maximal tensile shear strength at break of the bonded strip pairs*

| Protein | Wood | Tensile strength of dry strips (MPa)** | Tensile strength of soaked & dried strips (MPa)*** | # obs.**** |
|---|---|---|---|---|
| CSP | Pine | 2.40 ± 0.18$^{a,b}$ | 2.43 ± 0.33$^{b,c}$ | 10 |
|  | Walnut | 2.62 ± 0.25$^{a}$ | 2.74 ± 0.27$^{a,b}$ | 10 |
|  | Cherry | 2.34 ± 0.12$^{b}$ | 2.28 ± 0.10$^{c}$ | 10 |
|  | Maple | 2.37 ± 0.17$^{a,b}$ | 3.04 ± 0.30$^{a}$ | 10 |
| SP | Pine | 1.82 ± 0.28$^{c}$ | 0.57 ± 0.30$^{e}$ | 10 |
|  | Walnut | 1.78 ± 0.14$^{c}$ | 1.01 ± 0.24$^{d}$ | 8 |
|  | Cherry | 1.91 ± 0.10$^{c}$ | 0.13 ± 0.06$^{f}$ | 7 |
|  | Maple | 1.71 ± 0.11$^{c}$ | 0.31 ± 0.19$^{e,f}$ | 9 |

*In all cases testing was done on bonded wood composite strips 0.5 in. × 3.5 in. with a glued 0.5 in. × 1 in. overlap between two strips. Total number of wood composites = 10 for each treatment. Data in each column with the same superscript letter indicates that the treatments are not significantly different at p = 0.05.

**Testing done on bonded wood composite strips without soaking in water

***Testing done on bonded wood composite strips that were soaked twice in hot water at 63° C. (4 hours each time) and dried. These values provide estimates of the hot water resistance of the adhesives.

****Number of wood composites that remained attached after hot water treatment. (Total number of wood composites = 10.) Only composites where wood strips stayed attached were tested for tensile strength.

TABLE 2

Adhesive properties (dry adhesive strength and hot water resistance) of xylan and protein/xylan blends shown by the maximal tensile shear strength at break of the bonded strip pairs.

| Blend composition protein/xylan weight ratio | Dry TS* (MPa) | TS (MPa)*** | # strips measured | # wood breaks |
|---|---|---|---|---|
| Xylan (pure) | | | | |
| 0:100 | 1.12 ± 0.22$^{e}$ | | 0 | |
| Cottonseed protein | | | | |
| 100:0 | 2.48 ± 0.25$^{a,b,c}$ | 3.34 ± 0.23$^{a}$ | 10 | 2 |
| 90:10 | 2.83 ± 0.14$^{a}$ | | | |
| 80:20 | 2.81 ± 0.32$^{a,b}$ | 3.34 ± 0.28$^{a}$ | 10 | 3 |
| 70:30 | 2.80 ± 0.22$^{a,b}$ | | | |
| 60:40 | 2.87 ± 0.29$^{a}$ | 3.03 ± 0.38$^{a}$ | 10 | 1 |
| 50:50 | 2.36 ± 0.28$^{c}$ | | | |
| 40:60 | 2.37 ± 0.18$^{b,c}$ | 1.84 ± 0.30$^{b}$ | 10 | |
| 30:70 | 2.21 ± 0.37$^{c}$ | | | |
| 15:85 | 2.26 ± 0.28$^{c}$ | 0.20 ± 0.10$^{c}$ | 10 | |
| Soy protein | | | | |
| 100:0 | 1.49 ± 0.17$^{d,e}$ | 0.30 ± 0.17$^{c}$ | 7 | |
| 90:10 | 1.42 ± 0.18$^{d,e}$ | | | |
| 80:20 | 1.60 ± 0.18$^{d}$ | 0.28 ± 0.15$^{c}$ | 8 | |
| 70:30 | 1.39 ± 0.18$^{d,e}$ | | | |
| 60:40 | 1.49 ± 0.28$^{d,e}$ | | 0 | |
| 50:50 | 1.60 ± 0.36$^{d}$ | | | |
| 40:60 | 1.45 ± 0.33$^{d,e}$ | | 0 | |
| 30:70 | 1.32 ± 0.48$^{d,e}$ | | | |
| 15:85 | 1.34 ± 0.23$^{d,e}$ | | 0 | |

*TS = tensile strength. Tests conducted on bonded wood composites strips 0.5 in. × 3.5 in. with a 0.5 in. × 1.0 in. overlapped adhesive joint; ten wood strips used for each treatment. Data in this column with the same superscript letter indicate that the treatments are not significantly different at p = 0.05.

**Tests conducted on bonded wood composites strips 1.0 in. × 3.5 in. with a 1.0 in. × 1.0 in overlap adhesive joint that have been soaked twice in hot water and dried.

***Data in this column with the same superscript letter indicate that the treatments are not significantly different at p = 0.05. All soy protein/xylan blends with greater than 20% xylan failed during hot water treatment.

TABLE 3

Adhesive properties (dry adhesive strength and hot water resistance) of starch and protein/starch blends shown by the maximal tensile shear strength at break of the bonded strip pairs.

| Blend composition protein/starch weight ratio | Dry TS* (MPa) | TS (MPa)*** | # strips measured | # wood breaks |
|---|---|---|---|---|
| Starch (pure) | | | | |
| 0:100 | 0.74 ± 0.10$^{d}$ | | 0 | |
| Cottonseed protein | | | | |
| 100:0 | 2.48 ± 0.19$^{a}$ | 3.34 ± 0.23$^{a}$ | 10 | 2 |
| 75:25 | 2.28 ± 0.23$^{a}$ | 3.45 ± 0.28$^{a}$ | 10 | 5 |
| 50:50 | 2.29 ± 0.14$^{a}$ | 3.12 ± 0.38$^{a}$ | 10 | 7 |
| 25:75 | 1.86 ± 0.25$^{b}$ | 2.99 ± 0.59$^{a}$ | 10 | 5 |
| Soy protein | | | | |
| 100:0 | 1.46 ± 00.12$^{c}$ | 0.30 ± 0.17$^{c}$ | 7 | |
| 75:25 | 1.45 ± 0.19$^{c}$ | 1.03 ± 0.32$^{b}$ | 7 | |
| 50:50 | 1.45 ± 0.17$^{c}$ | 0.72 ± 0.37$^{b,c}$ | 7 | |
| 25:75 | 1.45 ± 0.18$^{c}$ | 0.61 ± 0.34$^{b,c}$ | 7 | |

*TS = tensile strength. Tests conducted on bonded wood composites strips 0.5 in. × 3.5 in. with a 0.5 in. × 1.0 in overlapped adhesive joint; ten wood strips used for each treatment. Data in this column with the same superscript letter indicate that the treatments are not significantly different at p = 0.05.

**Tests conducted on bonded wood composites strips 1.0 in. × 3.5 in. with a 1.0 in. × 1.0 in overlap adhesive joint that have been soaked twice in hot water and dried.

***Data in this column with the same superscript letter indicate that the treatments are not significantly different at p = 0.05. All specimens with starch alone failed during the hot water treatment.

TABLE 4

Adhesive properties (dry adhesive strength and hot water resistance) of cellulose and protein/cellulose blends shown by the maximal tensile shear strength at break of the bonded strip pairs.

| Blend composition protein/cellulose weight ratio | Dry TS* (MPa) | TS (MPa)*** | # strips measured | # wood breaks |
|---|---|---|---|---|
| Cellulose (pure) | | | | |
| 0:100 | 0.46 ± 0.08$^{d}$ | | 0 | |
| Cottonseed protein | | | | |
| 100:0 | 2.55 ± 0.26$^{a}$ | 3.34 ± 0.23$^{a}$ | 10 | 2 |
| 75:25 | 2.54 ± 0.19$^{a}$ | 2.67 ± 0.50$^{b}$ | 10 | |
| 50:50 | 2.54 ± 0.26$^{a}$ | 3.43 ± 0.23$^{a}$ | 10 | 7 |
| 25:75 | 2.36 ± 0.33$^{a}$ | 2.83 ± 0.50$^{b}$ | 10 | |
| Soy protein | | | | |
| 100:0 | 1.52 ± 0.12$^{b}$ | 0.30 ± 0.17$^{c}$ | 7 | |
| 75:25 | 1.54 ± 0.25$^{b}$ | 0.25 ± 0.10$^{c}$ | 6 | |
| 50:50 | 1.30 ± 0.26$^{b,c}$ | | 0 | |
| 25:75 | 1.05 ± 0.17$^{c}$ | | 0 | |

*TS = tensile strength Tests conducted on bonded wood composites strips 0.5 in. × 3.5 in. with a 0.5 in. × 1.0 in overlapped adhesive joint; ten wood strips used for each treatment. Data in this column with the same superscript letter indicate that the treatments are not significantly different at p = 0.05.

**Tests conducted on bonded wood composites strips 1.0 in. × 3.5 in. with a 1.0 in. × 1.0 in overlap adhesive joint, that have been soaked twice in hot water and dried.

***Data in this column with the same superscript letter indicate that the treatments are not significantly different at p = 0.05. All soy protein/cellulose blends tested with greater than 25% cellulose failed during the hot water treatment.

TABLE 5

Adhesive strength and % improvement over unmodified protein for cottonseed protein (CSP) and soy protein (SP) isolates with different modifiers at 0.5M concentration shown by the maximal tensile shear strength at break of the bonded strip pairs*

| Protein | Modifier | Tensile strength (MPa)** | % rel to control |
|---|---|---|---|
| CSP | None | $2.51 \pm 0.21^{f,g}$ | 0 |
| CSP | Glycine | $2.54 \pm 0.18^{f,g}$ | 1 |
| CSP | Histidine | $2.62 \pm 0.15^{e,f,g}$ | 4 |
| CSP | Aspartic acid | $3.45 \pm 0.30^{a,b}$ | 37 |
| CSP | Glutamic acid | $3.17 \pm 0.15^{c,d}$ | 26 |
| CSP | Arginine | $2.95 \pm 0.37^{d,e}$ | 18 |
| CSP | Lysine | $1.43 \pm 0.46^{i}$ | -43 |
| CSP | Tyrosine | $1.64 \pm 0.10^{i}$ | -35 |
| CSP | Leucine | $1.59 \pm 0.19^{i}$ | -37 |
| CSP | Stearic acid | $2.08 \pm 0.25^{h}$ | -17 |
| CSP | Palmitic acid | $2.30 \pm 0.21^{g,h}$ | -8 |
| CSP | Oleic acid | $1.61 \pm 0.15^{i}$ | -36 |
| CSP | Choline chloride | $2.76 \pm 0.21^{d,e,f}$ | 10 |
| CSP | Acetic acid | $3.31 \pm 0.28^{h}$ | 32 |
| CSP | Butyric acid | $2.90 \pm 0.17^{d,e}$ | 16 |
| CSP | Adipic acid | $3.61 \pm 0.23^{a}$ | 44 |
| SP | None | $1.50 \pm 0.15^{a,b}$ | 0 |
| SP | Glycine | $1.41 \pm 0.15^{a,h}$ | -6 |
| SP | Histidine | $0.69 \pm 0.15^{e,f}$ | -54 |
| SP | Aspartic acid | $1.52 \pm 0.08^{a,b}$ | 1 |
| SP | Glutamic acid | $1.50 \pm 0.15^{a,b}$ | 0 |
| SP | Arginine | $1.37 \pm 0.15^{a,b}$ | -9 |
| SP | Lysine | $0.86 \pm 0.28^{d,e}$ | 43 |
| SP | Tyrosine | $0.65 \pm 0.12^{e,f,g}$ | -57 |
| SP | Leucine | $0.51 \pm 0.15^{f,g}$ | -66 |
| SP | Stearic acid | $0.34 \pm 0.22^{g}$ | -77 |
| SP | Palmitic acid | $1.31 \pm 0.17^{a,b,c}$ | -13 |
| SP | Oleic acid | $1.08 \pm 0.21^{c,d}$ | -28 |
| SP | Choline chloride | $1.30 \pm 0.1^{b,c}$ | -13 |
| SP | Acetic acid | $1.35 \pm 0.22^{a,b}$ | -10 |
| SP | Butyric acid | $1.59 \pm 0.22^{a}$ | 6 |
| SP | Adipic acid | $1.52 \pm 0.19^{a,b}$ | 1 |

*Tests conducted on bonded maple wood composites strips 0.5 in. × 3.5 in. with a glued 0.5 in. × 1.0 in overlap between two strips.
**n = 10 for each treatment. Data in CSP and SP groups separately subjected to statistical analysis. Data for each protein with the same superscript letter indicate that the treatments are not significantly different at p = 0.05.

TABLE 6

Adhesive strength of cottonseed and soy protein isolate with selected modifiers at different concentrations shown by the maximal tensile shear strength at break of the bonded strip pairs*

| Modifier | Tensile Strength (MPa) at specified concentration of modifier** | | | | | | | | % max increase |
|---|---|---|---|---|---|---|---|---|---|
|  | 30 mM | 50 mM | 60 mM | 100 mM | 500 mM | 750 mM | 1000 mM | 1500 mM |  |
| Cottonseed Protein ($2.51 \pm 0.21^{j,k}$) | | | | | | | | | |
| Aspartic acid | $3.30 \pm 0.39^{c,d}$ | | $3.50 \pm 0.30^{b,c}$ | $3.74 \pm 0.40^{a+l}$ | $3.46 \pm 0.30^{b,c}$ | $2.69 \pm 0.23^{g,h,i,j}$ | $2.89 \pm 0.18^{f,g}$ | | 49 |
| Glutamic acid | $2.92 \pm 0.19^{e,f}$ | | $2.87 \pm 0.25^{f,g,h}$ | $3.19 \pm 0.32^{d,e}$ | $3.19 \pm 0.15^{d,e}$ | $2.94 \pm 0.36^{e,f}$ | $2.57 \pm 0.28^{i,j}$ | | 27 |
| Arginine | | | $2.81 \pm 0.30^{f,g,h,i}$ | $2.81 \pm 0.25^{f,g,h,i}$ | $2.95 \pm 0.37^{e,f}$ | $2.59 \pm 0.32^{i,j}$ | $2.70 \pm 0.25^{g,h,i,j}$ | | 18 |
| Choline | | | | $2.62 \pm 0.32^{h,i,j}$ | $3.02 \pm 0.54^{e,f}$ | | $2.65 \pm 0.26^{g,h,i,j}$ | $2.40 \pm 0.23^{j,k}$ | 20 |
| Butyric acid | | $2.84 \pm 0.22^{f,g,h}$ | | $3.48 \pm 0.22^{b,c}$ | $2.91 \pm 0.17^{f}$ | | $2.44 \pm 0.15^{j,k}$ | $2.26 \pm 0.26^{k}$ | 39 |
| Adipic acid | | $3.31 \pm 0.25^{c,d}$ | | $3.43 \pm 0.25^{b,c}$ | $3.61 \pm 0.23^{a,b}$ | | $3.34 \pm 0.34^{c,d}$ | $1.68 \pm 0.39^{l}$ | 44 |
| Soy Protein ($1.50 \pm 0.15^{b,c,d}$) | | | | | | | | | |
| Aspartic acid | $1.53 \pm 0.18^{b,c,d}$ | | $1.50 \pm 0.11^{b,c,d}$ | $1.42 \pm 0.12^{c,d,e}$ | $1.31 \pm 0.22^{e,f,g}$ | $1.19 \pm 0.32^{g,h,i}$ | $1.23 \pm 0.26^{f,g,h}$ | | 2 |
| Glutamic acid | $1.59 \pm 0.11^{a,b,c}$ | | $1.53 \pm 0.18^{b,c,d}$ | $1.45 \pm 0.11^{c,d,e}$ | $1.50 \pm 0.17^{b,c,d}$ | $1.64 \pm 0.15^{a,b}$ | $1.54 \pm 0.12^{a,b,c,d}$ | | 9 |
| Arginine | | | $1.45 \pm 0.17^{c,d,e}$ | $1.49 \pm 0.17^{b,c,d}$ | $1.37 \pm 0.15^{e,f,g}$ | $1.05 \pm 0.15^{i,j}$ | $0.88 \pm 0.14^{k}$ | | -1 |
| Choline | | | | $1.32 \pm 0.17^{e,f,g}$ | $1.30 \pm 0.11^{f,g,h}$ | | $0.94 \pm 0.11^{j,k}$ | $0.95 \pm 0.12^{j,k}$ | -12 |
| Butyric acid | | $1.28 \pm 0.32^{f,g,h}$ | | $1.39 \pm 0.17^{d,e,f}$ | $1.59 \pm 0.22^{a,b,c}$ | | $1.35 \pm 0.15^{e,f,g}$ | $1.70 \pm 0.26^{a}$ | 6 |
| Adipic acid | | $1.56 \pm 0.14^{b,c}$ | | $1.61 \pm 0.18^{a,b}$ | $1.52 \pm 0.19^{b,c,d}$ | | $1.42 \pm 0.28^{c,d,e}$ | $1.16 \pm 0.21^{h,i}$ | 7 |

*Tests conducted on bonded maple wood composites strips 0.5 in. × 3.5 in. with a glued 0.5 in. × 1.0 in overlap between two strips.

**n = 10 for each treatment. Data for cottonseed protein and soy protein were separately subjected to ANOVA treatment; the numbers with the same superscript letters indicate that the treatments are not significantly different at p = 0.05.

TABLE 7

Hot water resistance properties for cottonseed protein (CSP) and soy protein (SP) isolates with selective modifiers at 0.5M concentration shown by the maximal tensile shear strength at break of the bonded strip pairs *

| Protein | Modifier | # obs.** | tensile strength*** (MPa) | Number of wood breaks**** |
|---|---|---|---|---|
| CSP | None | 10 | $3.11 \pm 0.34^{a,b}$ | 6 |
| CSP | Aspartic acid | 10 | $2.94 \pm 0.23^{a,b}$ | 9 |
| CSP | Glutamic acid | 10 | $2.82 \pm 0.39^{b}$ | 9 |
| CSP | Arginine | 10 | $2.88 \pm 0.23^{a,b}$ | 9 |
| CSP | Butyric acid | 10 | $3.11 \pm 0.28^{a,b}$ | 7 |
| CSP | Adipic acid | 10 | $3.07 \pm 0.37^{a,b}$ | 10 |
| CSP | Acetic acid | 10 | $3.26 \pm 0.18^{a}$ | 10 |
| SP | None | 10 | $0.61 \pm 0.29^{c}$ | 0 |
| SP | Aspartic acid | 2 | $0.11 \pm 0.01^{d}$ | 0 |
| SP | Glutamic acid | 3 | $0.17 \pm 0.05^{d}$ | 0 |
| SP | Arginine | 0 | | |
| SP | Butyric acid | 10 | $0.47 \pm 0.21^{c}$ | 0 |
| SP | Adipic acid | 7 | $0.14 \pm 0.08^{d}$ | 0 |
| SP | Acetic acid | 9 | $0.46 \pm 0.21^{c}$ | 0 |

*Tests conducted on bonded wood composites strips 1.0 in. × 3.5 in. with a 1.0 in. × 1.0 in overlap adhesive joint that have been soaked twice in hot water and dried.
**Number of wood composites that remained attached after hot water treatment. (Total number of wood composites = 10.) Only composites where wood strips stayed attached were tested for tensile strength.
***Data in each column willi the same superscript letter indicate that the treatments are not significantly different at p = 0.05.
****Number of veneer strips that fractured during testing at places other than the adhesive joint In these cases the joint was stronger than the wood veneer itself.

TABLE 8

Adhesive strength of cottonseed protein (CSP) and soy protein (SP) with different concentrations (c) of the modifiers shown by the maximal tensile shear strength at break of the bonded strip pairs*

| Protein | Modifier | Tensile strength (MPa)** | | | | % max increase |
|---|---|---|---|---|---|---|
| | | c = 27 mM | c = 54 mM | c = 89 mM | c = 446 mM | |
| CSP | none | $2.52 \pm 0.08^{e}$ | $2.52 \pm 0.08^{d}$ | $2.52 \pm 0.08^{e,f}$ | $2.52 \pm 0.08^{b}$ | 0 |
| | Phosphoric acid | $3.20 \pm 0.30^{a,b}$ | $3.57 \pm 0.34^{a}$ | $3.34 \pm 0.43^{a,b}$ | $2.97 \pm 0.34^{a}$ | 42 |
| | Phosphorous acid | $3.06 \pm 0.15^{a,b,c}$ | $3.61 \pm 0.17^{a}$ | $3.23 \pm 0.23^{a,b,c}$ | $2.73 \pm 0.25^{a,b}$ | 44 |
| | Metaphosphoric acid | $2.52 \pm 0.12^{e}$ | $2.70 \pm 0.21^{c,d}$ | $3.06 \pm 0.28^{b,c,d}$ | $1.90 \pm 0.22^{c,d}$ | 22 |
| | Methylphosphonic acid | $3.34 \pm 0.17^{a}$ | $3.70 \pm 0.32^{a}$ | $3.43 \pm 0.34^{a}$ | $2.57 \pm 0.23^{b}$ | 47 |
| | Octadecyl phosphonic acid | $3.31 \pm 0.19^{a}$ | | | | 32 |
| | Bis(2-ethylhexyl) phosphate | $2.98 \pm 0.18^{b,c}$ | $2.55 \pm 0.17^{c,d}$ | $2.32 \pm 0.21^{f}$ | failed | 19 |
| | Sodium monododecyl phosphate | $2.79 \pm 0.15^{c,d,e}$ | $2.68 \pm 0.30^{c,d}$ | $2.79 \pm 0.18^{d,e}$ | $1.19 \pm 0.07^{e}$ | 11 |
| | Diethyl phosphite | $2.65 \pm 0.21^{d,e}$ | $2.80 \pm 0.17^{b,c,d}$ | $2.76 \pm 0.21^{d,e}$ | $2.87 \pm 0.17^{a}$ | 14 |
| | Sodium trimetaphosphate | $3.05 \pm 0.22^{a,b,c}$ | $2.55 \pm 0.22^{c,d}$ | $2.36 \pm 0.41^{f}$ | $1.70 \pm 0.21^{d}$ | 22 |
| | Tetrapotassium pyrophosphate | $3.03 \pm 0.22^{a,b,c}$ | $2.90 \pm 0.29^{b,c}$ | $2.84 \pm 0.22^{d,e}$ | $2.08 \pm 0.23^{c}$ | 21 |
| | Polyphosphoric acid | $3.05 \pm 0.29^{a,b,c}$ | $3.09 \pm 0.30^{b}$ | $2.91 \pm 0.28^{c,d}$ | $1.97 \pm 0.29^{c,d}$ | 23 |
| | Phytic acid | $2.92 \pm 0.35^{b,c,d}$ | | $2.30 \pm 0.12^{f}$ | | 16 |
| SP | none | $1.50 \pm 0.16^{a,b,c}$ | $1.50 \pm 0.16^{a,b,c}$ | $1.50 \pm 0.16^{b,c}$ | $1.50 \pm 0.16^{a,b}$ | 0 |
| | Phosphoric acid | $1.44 \pm 0.15^{b,c}$ | $1.60 \pm 0.15^{a}$ | $1.61 \pm 0.21^{b}$ | $1.38 \pm 0.14^{b,c}$ | 7 |
| | Phosphorous acid | $1.48 \pm 0.11^{a,b,c}$ | $1.49 \pm 0.17^{a,b,c}$ | $1.52 \pm 0.08^{b,c}$ | $1.60 \pm 0.14^{a,b}$ | 7 |
| | Metaphosphoric acid | $1.39 \pm 0.07^{b,c}$ | $1.50 \pm 0.17^{a,b,c}$ | $1.42 \pm 0.14^{b,c,d}$ | $1.52 \pm 0.21^{a,b}$ | 1 |
| | Methylphosphonic acid | $1.56 \pm 0.18^{a,b,c}$ | $1.56 \pm 0.12^{a,b}$ | $1.45 \pm 0.17^{b,c,d}$ | $1.39 \pm 0.25^{b,c}$ | 4 |
| | Octadecyl phosphonic acid | $0.90 \pm 0.15^{d}$ | | | | −40 |
| | Bis(2-ethylhexyl) phosphate | $1.50 \pm 0.19^{a,b,c}$ | $1.37 \pm 0.14^{b,c,d}$ | $1.35 \pm 0.25^{d}$ | $1.19 \pm 0.15^{c}$ | 0 |
| | Sodium monododecyl phosphate | $1.35 \pm 0.14^{c}$ | $1.24 \pm 0.11^{d}$ | $1.23 \pm 0.12^{d}$ | $0.90 \pm 0.08^{d}$ | −10 |
| | Diethyl phosphite | $1.57 \pm 0.15^{a,b}$ | $1.49 \pm 0.11^{a,b,c}$ | $1.56 \pm 0.10^{b,c}$ | $1.23 \pm 0.21^{c}$ | 4 |
| | Sodium trimetaphosphate | $1.43 \pm 0.14^{b,c}$ | $1.46 \pm 0.19^{a,b,c}$ | $1.39 \pm 0.29^{b,c,d}$ | $1.64 \pm 0.12^{a}$ | 9 |
| | Tetrapotassium pyrophosphate | $1.66 \pm 0.10^{a}$ | $1.32 \pm 0.10^{c,d}$ | $1.59 \pm 0.21^{b,c}$ | $1.66 \pm 0.14^{a}$ | 11 |
| | Polyphosphoric acid | $1.39 \pm 0.12^{b,c}$ | $1.41 \pm 0.07^{a,b,c,d}$ | $1.34 \pm 0.18^{c,d}$ | $1.26 \pm 0.21^{c}$ | −6 |
| | Phytic acid | $1.52 \pm 0.17^{a,b,c}$ | | $1.41 \pm 0.14^{b,c,d}$ | | 1 |

*Tests conducted on bonded maple wood strips 12.7 mm × 88.9 mm with a glued 12.7 mm × 25.4 mm overlap between the two strips.
**Data for a set of protein/additive combinations at a specific additive concentration were subjected to analysis of variance; the same superscript letters in a semi-column indicate that the values are not significantly different at p = 0.05.

TABLE 9

Adhhesive strength (TS) data of cottonseed protein (CSP) and soy protein (SP) with selected modifiers after hot water treatments shown by the maximal tensile shear strength at break of the bonded strip pairs*

| | | 0.6 mm maple veneer | | 1.59 mm maple veneer | | |
|---|---|---|---|---|---|---|
| Protein | Modifier | TS (MPa)** | # wood breaks*** | TS (MPa)** | % rel to control | # wood breaks*** |
| CSP | None | 3.17 ± 0.29$^a$ | 2/10 | 2.86 ± 0.72$^c$ | 0 | 0/10 |
| CSP | Phosphoric Acid, 54 mM | 3.30 ± 0.19$^a$ | 4/10 | 3.99 ± 0.41$^a$ | 40 | 0/10 |
| CSP | Phosphorous Acid, 54 mM | 3.44 ± 0.24$^a$ | 6/10 | 3.96 ± 0.61$^a$ | 38 | 1/10 |
| CSP | Metaphosphoric Acid, 89 mM | 3.35 ± 0.24$^a$ | 6/10 | 4.17 ± 0.78$^a$ | 46 | 0/10 |
| CSP | Methylphosphonic Acid, 54 mM | 3.41 ± 0.21$^a$ | 6/10 | 3.93 ± 0.53$^a$ | 37 | 0/10 |
| CSP | Bis(2-ethylhexyl) phosphate, 27 mM | 3.34 ± 0.31$^a$ | 3/10 | 3.14 ± 0.24$^{b,c}$ | 10 | 0/10 |
| CSP | Sodium trimetaphosphate, 27 mM | 3.34 ± 0.25$^a$ | 0/10 | 3.25 ± 0.32$^{b,c}$ | 14 | 0/10 |
| CSP | Tetrapotassium pyrophosphate), 27 mM | 3.35 ± 0.23$^a$ | 2/10 | 3.54 ± 0.44$^{a,b,c}$ | 24 | 1/10 |
| CSP | Polyphosphoric Acid, 27 mM | 3.38 ± 0.15$^a$ | 4/10 | 3.71 ± 0.44$^{a,b}$ | 30 | 0/10 |
| SP | None | 1.06 ± 0.40$^a$ | 0/10 | fell apart | | |
| SP | Phosphoric Acid, 27 mM | 1.00 ± 0.31$^a$ | 0/10 | fell apart | | |
| SP | Sodium trimetaphosphate, 27 mM | 0.44 ± 0.17$^b$ | 0/10 | fell apart | | |
| SP | Tetrapotassium pyrophosphate, 27 mM | 0.44 ± 0.21$^b$ | 0/10 | fell apart | | |

*Tests conducted on bonded wood composites strips 1.0 in. × 3.5 in. with a 1.0 in. × 1.0 in overlap adhesive joint that have been soaked twice in hot water and dried.
**Data for a set of protein/additive combinations were subjected to analysis of variance; the same superscript letters indicate that the values are not significantly different at p = 0.05.
***Number of veneer strips that fractured (out of 10 used) during testing at places other than the additive joint. In these cases the joint was stronger than the wood veneer itself

We claim:

1. An adhesive composition, said adhesive composition comprising cottonseed protein, optionally soy protein, and one or more of the following components: (i) a polysaccharide selected from the group consisting of hemicellulose, starch, cellulose, and mixtures thereof, (ii) a carboxylic acid selected from the group consisting of acetic acid, butyric acid, and adipic acid, (iii) a phosphorus-containing acid or ester, (iv) an amino acid selected from the group consisting of aspartic acid, glutamic acid, and arginine, (v) choline chloride, and mixtures thereof.

2. The adhesive composition of claim 1, wherein said cottonseed protein is selected from the group consisting of cottonseed protein isolate, cottonseed protein concentrate, cottonseed protein flour, water-washed cottonseed protein flour, buffer-washed cottonseed protein flour, and mixtures thereof.

3. The adhesive composition of claim 1, wherein said soy protein is selected from the group consisting of soy protein isolate, soy protein concentrate, soy protein flour, water-washed soy protein flour, buffer-washed soy protein flour, and mixtures thereof.

4. The adhesive composition of claim 1, wherein said polysaccharide is selected from the group consisting of hemicellulose, starch, cellulose, and mixtures thereof.

5. The adhesive composition of claim 4, wherein said hemicellulose is xylan.

6. The adhesive composition of claim 4, wherein said starch is pregelatinized starch.

7. The adhesive composition of claim 1, wherein said composition further comprises (iv) at least one member of the group consisting of water, plasticizer, and mixtures thereof.

8. The adhesive composition of claim 7, wherein said plasticizer is selected from the group consisting of glycerol, sorbitol, polyethylene glycol, and mixtures thereof.

9. The adhesive composition of claim 1, wherein said carboxylic acid is selected from acetic acid, butyric acid, and mixtures thereof.

10. The adhesive composition of claim 1, wherein said dicarboxylic acid is adipic acid.

11. The adhesive composition of claim 1, wherein said phosphorus-containing acid is selected from the group consisting of phosphoric acid, phosphorous acid, metaphosphoric acid, methylphosphonic acid, octadecylphosphonic acid, trimetaphosphoric acid, pyrophosphoric acid, polyphosphoric acid, phytic acid, and mixtures thereof.

12. The adhesive composition of claim 1, wherein said phosphorus-containing acid is in the form of a salt of sodium, potassium, or other cation.

13. The adhesive composition of claim 1, wherein said phosphorus-containing ester is selected from the group consisting of bis(2-ethylhexyl) phosphate, sodium monododecyl phosphate, diethyl phosphite, and mixtures thereof.

14. The adhesive composition of claim 1, wherein said cationic amino acid is arginine.

15. The adhesive composition of claim 1, wherein said quaternary ammonium salt is choline chloride.

16. The adhesive composition of claim 1, where the cottonseed protein/soy protein weight ratio is from about 10:90 to about 90:10 by weight, the cottonseed protein/polysaccharide weight ratio is from about 10:90 to about 90:10 by weight, and the cottonseed protein/modifier weight ratio is from about 90:10 to about 99.5:0.5 by weight.

17. A process for producing an adhesive composition, said process comprising mixing cottonseed protein and one or more of the following components: (i) soy protein, (ii) a polysaccharide, and (iii) at least one modifier selected from the group consisting of a carboxylic acid, a dicarboxylic acid, a phosphorus-containing acid or ester, a cationic amino acid, a quaternary ammonium salt, and mixtures thereof, and optionally (iv) at least one member of the group consisting of water, plasticizer, and mixtures thereof.

18. The process of claim 17, where the cottonseed protein/soy protein weight ratio is from about 10:90 to about 90:10 by weight, the cottonseed protein/polysaccharide weight ratio is from about 10:90 to about 90:10 by weight, and the cottonseed protein/modifier weight ratio is from about 90:10 to about 99.5:0.5 by weight.

19. The process of claim 17, wherein the pH of said process is from about 4 to about 12.

20. The process of claim 17, wherein said water or said plasticizer is present in an amount from about 30% (w/w) to about 98% (w/w) of the adhesive composition.

21. A method of bonding a first article to a second article, said method comprising (a) producing an adhesive composition by mixing cottonseed protein, optionally soy protein, and one or more of the following components: (i) a polysaccharide selected from the group consisting of hemicellulose, starch, cellulose, and mixtures thereof, (ii) a carboxylic acid selected from the group consisting of acetic acid, butyric acid, and adipic acid, (iii) a phosphorus-containing acid or ester, (iv) an amino acid selected from the group consisting of aspartic acid, glutamic acid, and arginine, (v) choline chloride, and mixtures thereof, and optionally (vi) at least one member of the group consisting of water, plasticizer, and mixtures thereof, at a pH of about 4 to about 12 and at a temperature of about 20° to about 60° C.; (b) depositing on a surface of said first article said adhesive composition thereby creating a binding area; and (c) contacting said binding area with a surface of said second article; and (d) applying heat and pressure to bond said first article to said second article.

22. The method of claim 21, wherein said method comprises (d) applying heat at about 60° to about 200° C. and pressure at about 0.4 MPa to about 14 MPa for about 1 minute to about 90 minutes to bond said first article to said second article.

23. The method of claim 21, wherein said first article and said second article are selected from the group consisting of wood veneers, wood layers, wood fibers, and wood particulates.

24. An adhesive product comprising the adhesive composition according to claim 1.

25. A product comprising a first article bonded to a second article by the method according to claim 21.

26. A method of producing a composite material comprising: (a) combining wood strands, particles, fibers, or veneers with the adhesive composition of claim 1 to produce a mixture; and (b) curing the mixture produced by step (a) to produce the composite material.

27. An adhesive composition, said adhesive composition comprising cottonseed protein, optionally soy protein, and one or more of the following components: (i) a phosphorus-containing ester selected from the group consisting of bis (2-ethylhexyl) phosphate, sodium monododecyl phosphate, diethyl phosphite, and mixtures thereof, (ii) arginine, (iii) choline chloride, and mixtures thereof.

* * * * *